(12) United States Patent
Koul et al.

(10) Patent No.: US 10,990,293 B2
(45) Date of Patent: *Apr. 27, 2021

(54) EXTENSIBLE STORAGE SYSTEM AND METHOD

(71) Applicant: Western Digital Technologies, Inc., San Jose, CA (US)

(72) Inventors: Rajesh Koul, San Jose, CA (US); Rodney N. Mullendore, San Jose, CA (US); James J. Walsh, Santa Clara, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/821,918

(22) Filed: Mar. 17, 2020

(65) Prior Publication Data

US 2020/0218457 A1 Jul. 9, 2020

Related U.S. Application Data

(63) Continuation of application No. 16/452,465, filed on Jun. 25, 2019, now Pat. No. 10,642,503, which is a
(Continued)

(51) Int. Cl.
*G06F 3/06* (2006.01)
*G06F 13/10* (2006.01)
*G06F 13/40* (2006.01)

(52) U.S. Cl.
CPC .......... *G06F 3/0613* (2013.01); *G06F 3/0607* (2013.01); *G06F 3/0659* (2013.01);
(Continued)

(58) Field of Classification Search
CPC ...... G06F 3/061; G06F 3/0611; G06F 3/0613; G06F 3/0619; G06F 3/0655;
(Continued)

(56) References Cited

U.S. PATENT DOCUMENTS 6,282,610 B1 8/2001 Bergsten
7,574,555 B2 8/2009 Porat et al.
(Continued)

OTHER PUBLICATIONS

Patrizio, "New Mosaid SSD Packs Two Terabytes Into a Single SATA Flash Drive," Aug. 22, 2012, retrieved from http://www.notebookreview.com/news/new-mosaid-ssd-packs-two-terabytes-into-a-single-sata-flash-drive/, 2 pages.
(Continued)

*Primary Examiner* — Thomas J. Cleary
(74) *Attorney, Agent, or Firm* — Morgan, Lewis & Bockius LLP

(57) ABSTRACT

A storage system controller chip includes routing circuitry comprising a host interface for coupling to a host device and an extension interface for coupling to a secondary controller chip. A host controller is coupled to a logical interface of the routing circuitry for receiving a host data access command from the host device via the host interface and logical interface. The routing circuitry transfers the host data access command to the secondary controller chip via the extension interface. The storage system controller chip further includes processor circuitry coupled to the logical interface of the routing circuitry. The processor circuitry receives an indication from the secondary controller chip via the extension interface that execution of the host data access command has been completed by the secondary controller chip and instructs the host controller to notify the host device that execution of the host data access command has been completed.

20 Claims, 4 Drawing Sheets

Related U.S. Application Data continuation of application No. 15/662,170, filed on Jul. 27, 2017, now Pat. No. 10,372,346.

(60) Provisional application No. 62/368,938, filed on Jul. 29, 2016.

(52) U.S. Cl.
CPC .......... *G06F 3/0664* (2013.01); *G06F 3/0683* (2013.01); *G06F 3/0688* (2013.01); *G06F 13/102* (2013.01); *G06F 13/4045* (2013.01); *Y02D 10/00* (2018.01)

(58) Field of Classification Search
CPC ...... G06F 3/0658; G06F 3/0659; G06F 3/067; G06F 3/0683; G06F 3/0685; G06F 3/0686; G06F 3/0688; G06F 3/0689; G06F 13/102; G06F 13/12; G06F 13/16; G06F 13/1668; G06F 13/1684; G06F 13/4004; G06F 13/4022; G06F 13/4027; G06F 13/4045; Y02D 10/14; Y02D 10/00
See application file for complete search history.

(56) References Cited

U.S. PATENT DOCUMENTS

| | | |
|---|---|---|
| 7,979,662 B2 | 7/2011 | Perry |
| 8,244,961 B2 | 8/2012 | Luo et al. |
| 10,372,346 B2 | 8/2019 | Koul |
| 10,642,503 B2 * | 5/2020 | Koul .................... G06F 3/0664 |
| 2004/0193824 A1 | 9/2004 | Johnson |
| 2005/0071559 A1 | 3/2005 | Tamura |
| 2005/0086413 A1 | 4/2005 | Lee et al. |
| 2008/0228994 A1 | 9/2008 | Lu et al. |
| 2010/0153635 A1 | 6/2010 | LaPanse et al. |
| 2011/0167201 A1 | 7/2011 | Huang |
| 2013/0311696 A1 | 11/2013 | Huff et al. |
| 2014/0310441 A1 | 10/2014 | Klughart |
| 2015/0242128 A1 | 8/2015 | Margalit et al. |

OTHER PUBLICATIONS

Tavakkol e al., "Design for scalability in enterprise SSDs." Proceedings of the 23rd International Conference on Parallel Architecture and Compilation, 2014, pp. 417-430.

\* cited by examiner

EXTENSIBLE STORAGE SYSTEM AND METHOD

This application is a continuation of application Ser. No. 16/452,465, filed on Jun. 25, 2019, now U.S. Pat. No. 10,642,503, which is a continuation of application Ser. No. 15/662,170, filed on Jul. 27, 2017, now U.S. Pat. No. 10,372,346, which claims the benefit of U.S. Provisional Application No. 62/368,938, filed on Jul. 29, 2016, the entirety of each of which is incorporated herein by reference.

BACKGROUND

Solid-state drives (SSDs) are used in a many different types of applications. These different applications may require different storage capacities as well as different performance levels. SSD controllers typically have been developed for particular applications, resulting in different SSD controllers being developed for each type of application. However, SSD controller development costs can be high in terms of both time and money. High costs may limit the development of SSD controllers to a small group of applications and therefore may leave less popular applications with sub-optimal SSD controller solutions.

SUMMARY

According to aspects of the subject technology, a method is described which includes receiving a host data access command at a primary controller chip coupled to a host device via a primary host interface of the primary controller chip and transferring the host data access command from the primary controller chip to a secondary controller chip coupled to the primary controller chip via an extension interface of the primary controller chip. The method further includes receiving an indication from the secondary controller chip that execution of the transferred host data access command by the secondary controller chip has been completed and notifying the host device, in response to the received indication, that execution of the host data access command has been completed.

According to aspects of the subject technology, a storage system controller chip includes routing circuitry comprising a host interface configured to be coupled to a host device and an extension interface configured to be coupled to a secondary controller chip. The storage system controller chip further includes a host controller coupled to a logical interface of the routing circuitry, the host controller configured to receive a host data access command from the host device via the host interface and the logical interface of the routing circuitry. The routing circuitry is further configured to transfer the host data access command to the secondary controller chip via the extension interface. The storage system controller chip further includes a media controller coupled to the host controller and configured to transfer data between the storage system controller chip and storage media coupled to the media controller based on the received host data access command. The storage system controller chip further includes processor circuitry coupled to the logical interface of the routing circuitry. The processor circuitry is configured to receive an indication from the secondary controller chip via the extension interface that execution of the host data access command has been completed by the secondary controller chip and instruct the host controller, in response to the received indication, to notify the host device that execution of the host data access command has been completed.

According to aspects of the subject technology, a data storage system includes a primary controller chip comprising a first host interface configured to be coupled to a host device and a first extension interface. The data storage system further includes first storage media coupled to the primary controller chip. The data storage system further includes a secondary controller chip comprising a second host interface coupled to the extension interface of the primary controller chip and a second extension interface. The data storage system further includes second storage media coupled to the secondary controller chip. The primary controller chip is configured to receive a host data access command from a host device via the first host interface and transfer the host data access command to the secondary controller chip. The primary controller is further configured to receive an indication from the secondary controller chip that execution of the transferred host data access command has been completed for data in the second storage media and notify the host device, in response to the received indication, that execution of the host data access command has been completed. The secondary controller chip is configured to receive the host data access command from the primary controller chip, execute the host data access command for the data in the second storage media, and notify the primary controller chip that the host data access command has been completed.

According to aspects of the subject technology, a storage system controller is described that includes means for receiving a host data access command at a primary controller chip coupled to a host device via a primary host interface of the primary controller chip and means for transferring the host data access command from the primary controller chip to a secondary controller chip coupled to the primary controller chip via an extension interface of the primary controller chip. The storage system controller further includes means for receiving an indication from the secondary controller chip that execution of the transferred host data access command by the secondary controller chip has been completed and means for notifying the host device, in response to the received indication, that execution of the host data access command has been completed.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

The subject technology offers a cost and power efficient way to scale data storage system (e.g., SSD) capacity and performance using extensible controller chips. Development resources may be focused on a single controller chip design that is configured to allow capacity and/or performance to be scaled based on the number of controller chips incorporated into a data storage system. The controller chip design facilitates interconnection of controller chips without requiring the cost and power consumption of separate interconnect chips, while presenting the overall data storage system to a host device as a single data storage system regardless of the number of controller chips used in the data storage system.

Figure 1A:
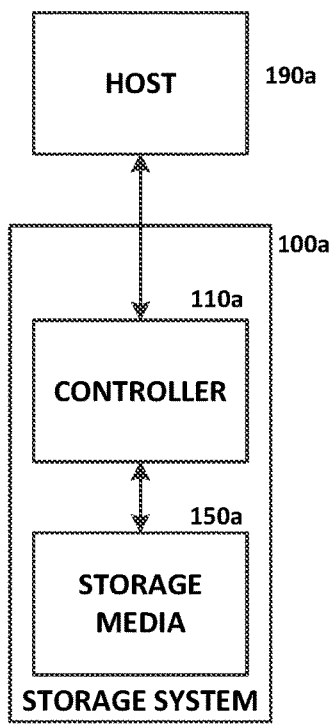
FIGS. 1A, 1B and 1C are block diagrams illustrating components of data storage systems according to aspects of the subject technology.

FIG. 1A is a block diagram illustrating components of a data storage system according to aspects of the subject technology. FIG. 1A depicts data storage system 100a, which includes controller chip 110a and storage media 150a, coupled to host device 190a. Briefly, controller chip 110a is configured to receive data access commands from host device 190a and execute the data access commands. For example, the data access commands may include write commands in which host device 190a provides host data to controller chip 110a, which writes the host data to storage media 150a, and read commands in which controller chip 110a reads requested host data from storage media 150a and provides the read host data to host device 190a.

Controller chip 110a is coupled to host device 190a via a host interface. The host interface includes electrical and physical components to facilitate the coupling and communication of data and associated data access commands between controller chip 110a and host device 190a. Other signals and information may be communicated via the host interface to manage the connection between controller chip 110a and host device 190a. The host interface may implement a standard interface protocol, such as Peripheral Component Interconnect—Express (PCIe), Serial Attached SCSI (SAS), Serial AT Attachment (SATA), etc., or a proprietary interface protocol.

Storage media 150a represents solid-state memory according to aspects of the subject technology. For example, storage media 150a may be implemented using flash memory, such as NAND flash memory. While depicted in FIG. 1A as a single component or chip of data storage system 100a, storage media 150a may be implemented using multiple storage media components or chips. Multiple storage media components or chips may be arranged in channels managed by controller chip 110a. Each channel may include a single component or chip of storage media or multiple components or chips of storage media. The available data throughput that controller chip 110a can provide may be constrained by the rate at which individual components of storage media 150a can process data accesses as well as the number of components of storage media 150a that are able to receive and executed data access commands in parallel, either on a single channel or across multiple channels.

Furthermore, the capacity of data storage supported by controller chip 110a is limited by the capacity of storage media 150a, either as a single component or chip or as multiple components or chips arranged in multiple physical channels. Each component of storage media 150a may include an array of physical memory cells, such as flash memory cells, arranged into physical blocks each physical block containing one or more physical pages. Using indirection tables, controller chip 110a maps logical addresses used by host device 190a to reference host data to physical addresses of storage media 150a to keep track of where the host data is written within storage media 150a. Accordingly, the amount of memory accessible to host device 190a via controller chip 110a is limited by the physical capacity of available memory cells of storage media 150a.

Figure 1B:
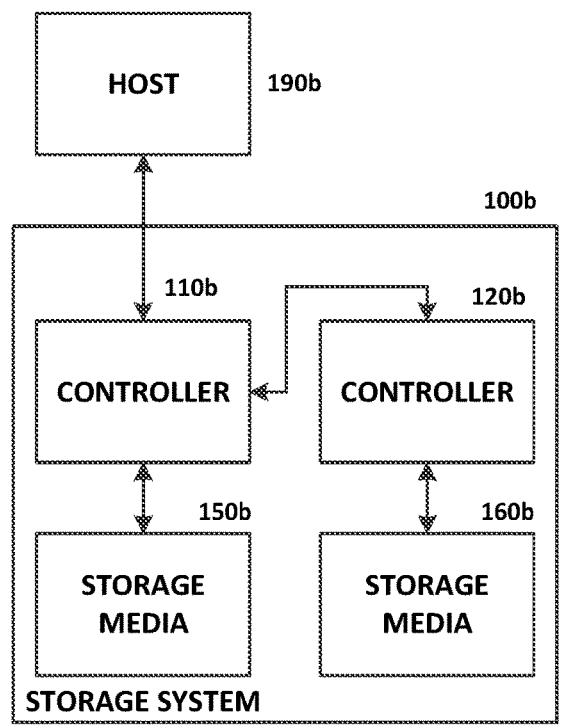

For applications that may require more data capacity or higher data throughput than is available from a single instance of controller chip 110a, the subject technology utilizes additional instances of controller chip 110a with respective additional instances of storage media 150a. For example, FIG. 1B is a block diagram depicting components of data storage system 100b according to aspects of the subject technology. As depicted in FIG. 1B, data storage system 100b includes primary controller chip 110b and secondary controller chip 120b, coupled to primary storage media 150b and secondary storage media 160b, respectively. Primary controller chip 110b and secondary controller chip 120b represent two instances of controller chip 110a described with respect to FIG. 1A. Similarly, primary storage media 150b and secondary storage media 160b represent two instances of storage media 150a described above with respect to FIG. 1A.

Similar to controller chip 110a represented in FIG. 1A, primary controller chip 110b is coupled to host device 190b via a host interface. To provide extensibility to primary controller chip 110b, as well as secondary controller chip 120b, an extension interface is added to the controller chip design. As with the host interface, the extension interface includes electrical and physical components to facilitate the coupling and communication of data and associated data access commands between primary controller chip 110b and secondary controller chip 120b. Other signals and information may be communicated via the extension interface to manage the connection between primary controller chip 110b and secondary controller chip 120b.

As depicted in FIG. 1B, the host interface of secondary controller chip 120b is coupled to the extension interface of primary controller chip 110b. Accordingly, the extension interface implements an interface protocol that is at least compatible with the interface protocol implemented by the host interface and in many instances is the same interface protocol (e.g., PCIe, SAS, SATA). However, data storage system 100b presents a single host interface to host device 190b even though the system includes two instances of the controller chip and associated storage media. In order to take advantage of the two controller chips and the increased data storage capacity provided by storage media 150b and 160b, the host interface may be implemented with a higher bandwidth than the extension interface. For example, the host interface may be implemented with PCIe x8 while the extension interface may be implemented with PCIe x4, allowing the full bandwidth of the host interface coupling host device 190b to data storage system 100b to be split between primary controller chip 110b and secondary controller chip 120b. The difference between the bandwidths available via the host interface and the extension interface may be even larger than that described in the example above to provide bandwidth space for additional controller chips and associated storage media to be incorporated into a data storage system, similar to that shown in FIG. 1C described below. For example, the host interface may be implemented with PCIe x32 and the extension interface at PCIe x4, leaving bandwidth available for as many as eight controller chips and associated storage media connected in the manner shown in FIG. 1B. In one or more examples, a bandwidth of the host interface is greater than a bandwidth of the logical interface and a bandwidth of the extension interface. Thus, the bandwidth of the host interface may be equal to or greater than the sum of the bandwidth of the logical interface and the bandwidth of the extension interface.

Figure 1C:
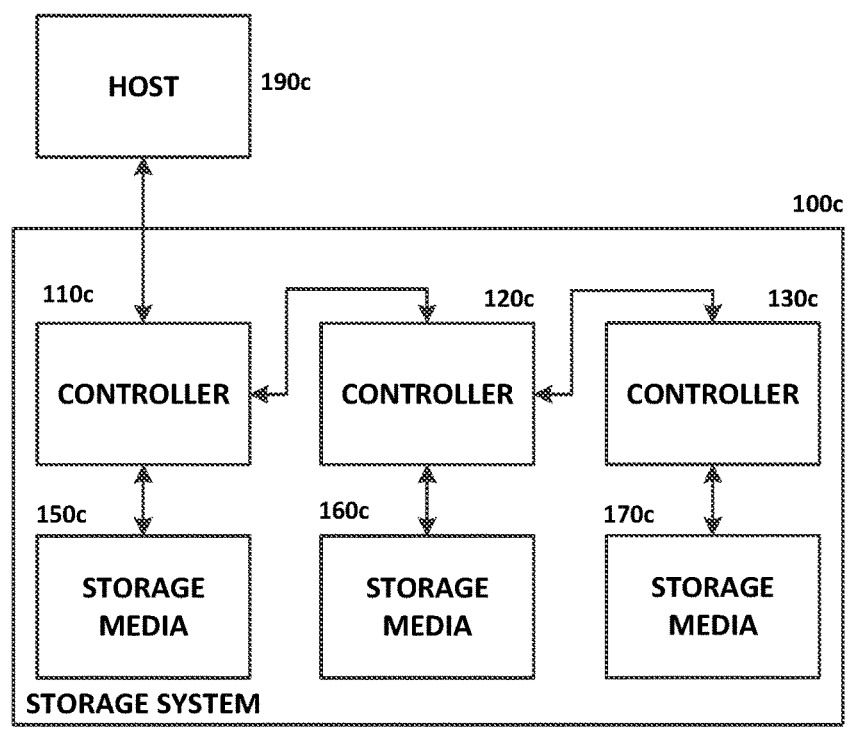

FIG. 1C is a block diagram depicting components of data storage system 100c according to aspects of the subject technology. Similar to the arrangement depicted in FIG. 1B, data storage system 100c incorporates multiple instances controller chips with associated storage media to increase the available data storage capacity for host device 190c. In particular, data storage system 100c includes primary controller chip 110c, secondary controller chip 120c and tertiary controller chip 130c, each corresponding to an instance of controller chip 110a described above. The coupling of secondary controller chip 120c and tertiary controller chip 130c is similar to that described above with respect to primary controller chip 110b and secondary controller chip 120b shown in FIG. 1B.

Along these lines, primary storage media 150c, secondary storage media 160c and tertiary storage media 170c correspond to instances of storage media 150a described above with respect to FIG. 1A. Primary storage media 150c, secondary storage media 160c and tertiary storage media 170c may be identical in arrangement and capacity, or may vary in either or both arrangement and capacity within the scope of the subject technology.

As illustrated in FIGS. 1A, 1B and 1C, a single design for a controller chip can be used to provide extensibility to data storage system design. Using these arrangements, data storage systems can be cost effectively designed to increase available data storage capacity needs for varying applications and provide increased throughput by splitting responsibility for host data from a host device among the coupled controller chips and associated storage media, which is described in further detail below.

Figure 2:
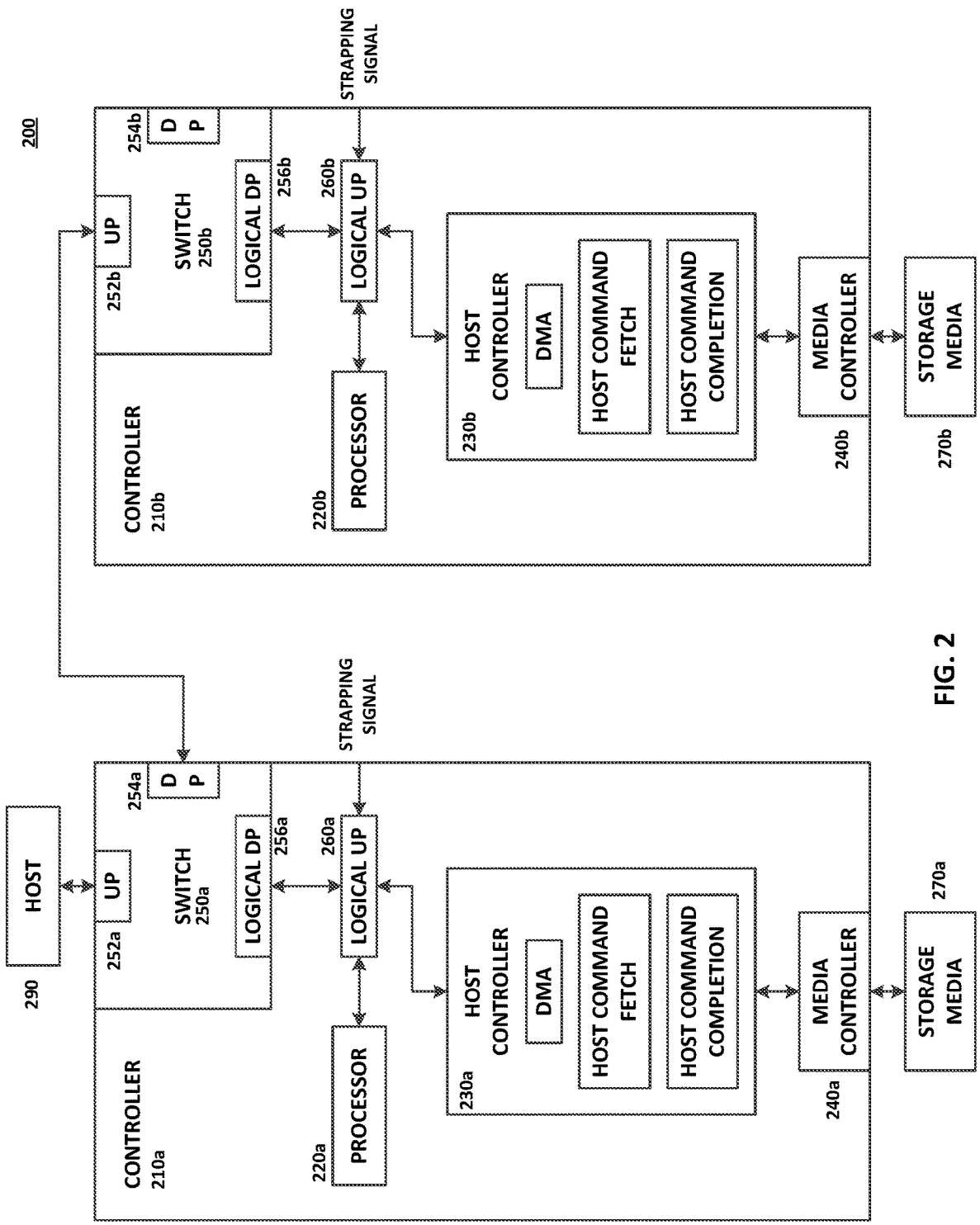
FIG. 2 is a block diagram illustrating components of a data storage system according to aspects of the subject technology.

Turning to FIG. 2, a block diagram is provided which illustrates components of data storage system 200 according to aspects of the subject technology. Data storage system 200 is configured similar to data storage system 100b described above with respect to FIG. 1B. In particular, data storage system 200 includes primary controller chip 210a coupled to host device 290 via a host interface and to secondary controller chip 210b via an extension interface. Primary controller chip 210a is further coupled to first storage media 270a while secondary controller chip 210b is coupled to second storage media 270b. In this manner, data storage system 200 has been scaled up using primary controller chip 210a and secondary controller chip 210b to increase the available data storage capacity using first storage media 270a and second storage media 270b and well as increase the possible throughput of the system using the two controller chips and associated storage media in parallel.

According to aspects of the subject technology, primary controller chip 210a includes processor circuitry 220a, host controller 230a and media controller 240a. Processor circuitry 220a may be configured to implement state machines and/or execute sequences of instructions (e.g., firmware) to manage the operations of primary controller chip 210a. The operations may include responding to host data access commands, background maintenance of storage media 270a (e.g., garbage collection), maintain indirection tables, maintain operation metric tables for storage media 270a, etc. Processor circuitry 220a may be implemented using a single processing core or multiple processing cores.

As depicted in FIG. 2, host controller 230a includes a direct memory access (DMA) module, a host command fetch module and a host command complete module. Each of these modules may be implemented with hardware circuitry or a combination of hardware circuitry and processor circuitry executing sequences of instructions (e.g., firmware) to perform operations described herein. For example, the host command fetch module may fetch a host data access command from host 290 upon receiving an indication that a host data access command is ready for processing. The DMA module may be programed to transfer data between host device and components within primary controller chip 210a. For example, the DMA module may transfer data from host device 290 to media controller 240a during the execution of a write data access command and from media controller 240a to host device 290 during the execution of a read data access command. The DMA module may access one or more buffers within primary controller chip 210a to temporarily store data during the execution of data access commands or other memory-related operations. The buffers, not illustrated in the figure, may be incorporated into processor 220a, host controller 230a, and/or media controller 240a. Alternatively, one or more buffers may be separate from these different components within primary controller chip 210a.

Media controller 240a may be implemented with hardware circuitry or a combination of hardware circuitry and processor circuitry executing sequences of instructions (e.g., firmware) to perform operations described herein. Media controller 240a writes data to storage media 270a in response to receiving write commands and reads data from storage media 270a in response to receiving read commands. During execution of read and write operations, media controller 240a may provide commands, addresses and data to storage media 270a and may receive data and status indicators from storage media 270a. The subject technology is not limited to any particular protocols for communications between media controller 240a and storage media 270a.

According to aspects of the subject technology, primary controller chip 210a is designed to include routing circuitry to facility the connection of additional controller chips in a daisy chain configuration, for example, such as that shown in FIGS. 1B and 1C. In the example illustrated in FIG. 2, the routing circuitry is represented at least in part by switch 250a. As depicted, switch 250a includes upstream port (UP) 252a, downstream port (DP) 254a and logical DP 256a. In this example, UP 252a corresponds to the host interface described above and is used to couple switch 250a to host device 290. DP 254a corresponds to the extension interface described above and is used to couple switch 250a to secondary controller chip 210b.

Logical DP 256a provides a port for the internal components of primary controller chip 210a to be coupled to switch 250a, via logical UP 260a. Logical DP 256a and logical UP 260a provide similar functionality as that provided by UP 252a and DP 254a within the protocols used for the host interface and extension interface (e.g., PCIe, SAS, SATA). However, logical DP 256a and logical UP 260a may not include physical interconnect components used to physically couple another chip to primary controller chip 210a. Rather, logical DP 256a and logical UP 260a may include logical circuitry to couple the internal components of primary controller chip 210a to switch 250a to allow the exchange of packets between primary controller chip 210*a*, secondary controller chip 210*b* and host device 290 according to the processes described herein.

The components of primary controller chip 210*a* are shown with interconnections represented by double-ended arrows. The components of primary controller chip 210*a* may communicate data, instructions and control signals using one or more internal buses. The buses may correspond to the arrangement of the double-ended arrows. However, the subject technology is not limited to the arrangement shown in FIG. 2 and may be implemented using other numbers and configurations of buses to interconnect the components of primary controller chip 210*a*.

According to aspects of the subject technology, primary controller chip 210*a* represents a chip package comprising one or more die encapsulated with external connectors for the host interface and extension interface described above, the interface between media controller 240*a* and storage media 270*a*, as well as other power and control signals that may be used in the operation of primary controller chip 210*a*. The components of primary controller chip 210*a* may be incorporated onto a single die, or the components may be implemented using two or more die interconnected within chip packaging to present a multi-die or multi-chip module as a single chip module. The inclusion of the routing circuitry, in the form of switch 250*a* in this example, within primary controller chip 210*a* allows multiple controller chips to be interconnected (e.g., daisy-chained) without requiring the use of interconnection chips or other forms of interconnection hardware to facilitate communications between the controller chips.

Similar to primary controller chip 210*a*, secondary controller chip 210*b* includes processor circuitry 220*b*, host controller 230*b*, media controller 240*b* and switch 250*b*. Switch 250*b* includes UP 252*b*, DP 254*b* and logical DP 256, which interfaces with logical UP 260*b*. In the depicted arrangement, media controller 240*b* is coupled to storage media 270*b* and UP 252*b* of switch 250*b* is coupled to primary controller 210*a*. The components of secondary controller chip 210*b* correspond to the commonly named components within primary controller chip 210*a*, whose operations and configurations are described above and will not be repeated here.

Figure 3:
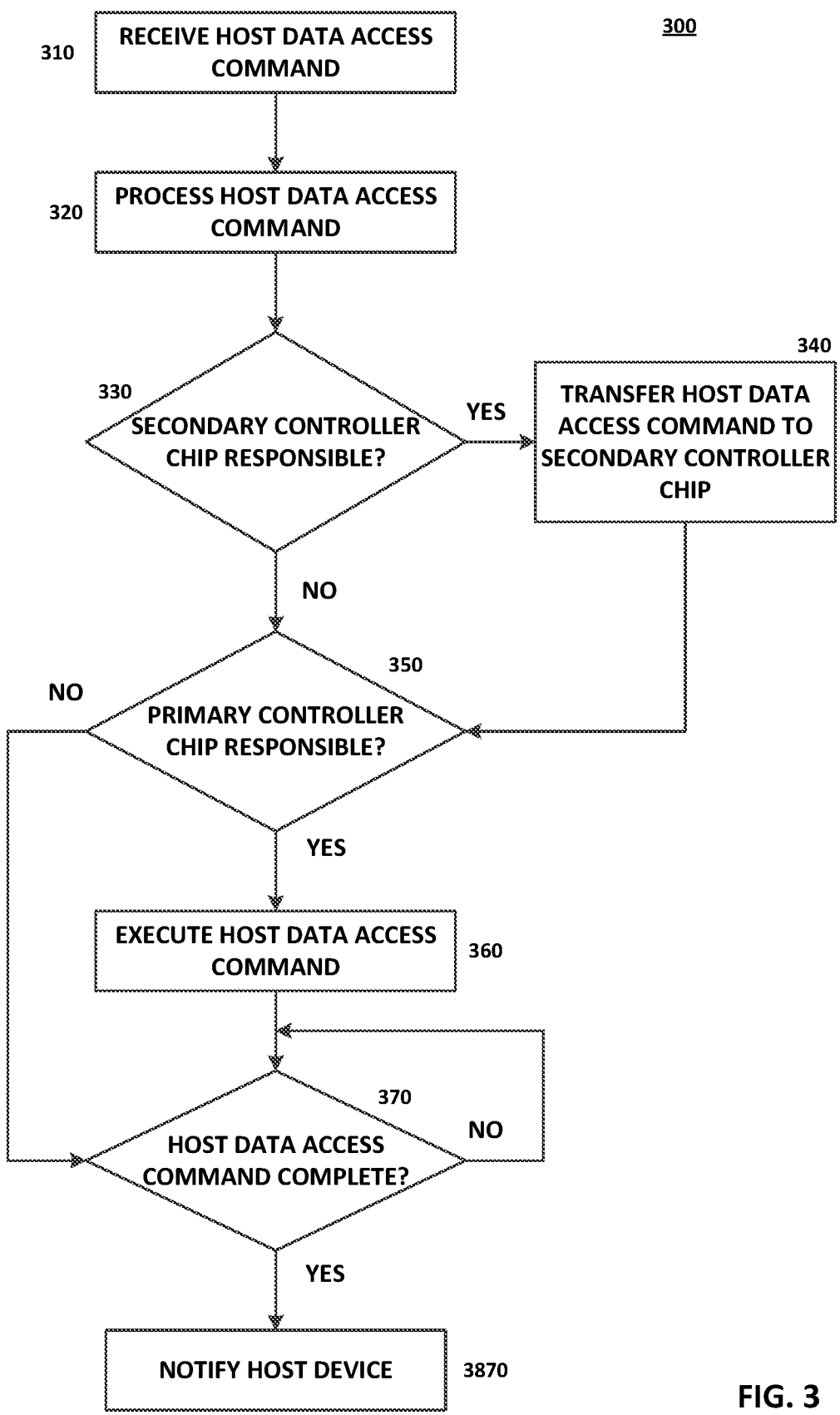
FIG. 3 includes a flowchart illustrating a process for processing host data access commands according to aspects of the subject technology.

FIG. 3 includes a flowchart illustrating a process 300 for processing host data access commands according to aspects of the subject technology. For explanatory purposes, the example process 300 is described herein with reference to components discussed above with respect to FIG. 2; however, the example process 300 is not limited to the components and arrangement represented in FIG. 2. Further for explanatory purposes, the blocks of the example process 300 are described herein as occurring in serial, or linearly. However, multiple blocks of the example process 300 may occur in parallel. In addition, the blocks of the example process 300 need not be performed in the order shown and/or one or more of the blocks of the example process 300 need not be performed.

In block 310, a host data access command is received by a primary controller chip from a host device coupled to the primary controller chip. The host device may be coupled to the primary controller chip via a host interface. The host data access command may be fetched from the host device by a host controller of the primary controller chip in response to receiving an indication from the host device that a host data access command is available for processing. The indication may be a value written to a register associated with the host controller by the host device.

According to aspects of the subject technology, the primary controller chip may be configured to be the only controller chip visible to the host device. For example, a strapping option such as that available under Non-Volatile Memory Express (NVMe) may be used to set the primary controller chip to be visible to the host device while leaving a secondary controller chip coupled to the primary controller chip via an extension interface of routing circuitry invisible to the host device. As represented in FIG. 2, an optional strapping signal to each of the logical UP 260*a* in the primary controller chip and the logical UP 260*b* in the secondary controller chip may set high or low depending on desired visibility. Under this configuration, the primary controller chip receives the indication of a new host data access command being available for processing and fetches the host data access command.

In block 320, the host data access command is processed/interpreted by processor circuitry of the primary controller chip. For example, the processor circuitry may parse the host data access command to determine a type of command and the logical addresses of the data referenced by the host data access command. For example, the host data access command may be processed to determine that the command is a read or a write command, as well as identify the logical addresses of the host data to be written to the data storage system or read from the data storage system.

In block 330, the processor circuitry of the primary controller chip determines whether the secondary controller chip is responsible for any of the data referenced in the host data access command. This determination may be based on a division of the range of logical addresses used by the host device to identify data. For example, each of the primary controller chip and the secondary controller chip may be assigned a particular range of logical address for host data. The processor circuitry may compare the logical addresses parsed from the host data access command against the assigned ranges of logical addresses to determine if the secondary controller chip is responsible for any of the referenced data. The assigned ranges may be based on a modulo operation that automatically assigns logical addresses based on the results of a modulo operation performed on the logical address parsed from the host data access command. In the simple example of two controller chips, the primary controller chip and the secondary controller chip, even logical addresses may be assigned to one while odd logical addresses may be assigned to the other. Alternatively, namespaces such as NVMe namespaces may be assigned to respective controller chips and namespaces parsed from host data access commands may be used to identify which controller chip is responsible for at least some of the data referenced in the host data access command.

If the secondary controller chip is determined to be responsible for any portion of the data referenced in the host data access command in block 330, the host data access command may be transferred to the secondary controller chip via an extension interface of routing circuitry in the primary controller chip in block 340. The transferred host data access command may be modified by the primary controller chip to reference only data for which the secondary controller chip is responsible prior to transfer to the secondary controller chip. The secondary controller chip may be instructed to execute the transferred host data command by the primary controller chip. The instruction received from the primary controller chip may cause the secondary controller chip to skip the operation of determining which controller chip is responsible for the data referenced in the host data access command since that operation was already performed by the primary controller chip. Alternatively, the secondary controller chip may be configured to skip that determination based on the strapping option discussed above for designating a primary controller chip and a secondary controller chip or some other configuration setting.

The controller chip design used for the primary controller chip and the secondary controller chip may include additional Base Address Register (BAR) space for each of the controller chips to access the other's internal registers and other hardware structures typically not accessible in conventional controller chip designs. The ability to access and set internal registers on the other controller chip may allow for the primary controller chip to notify the secondary controller chip of the host data access command for which the secondary controller chip is at least partially responsible for the referenced data in a manner similar to that used by the host device with the primary controller chip, as well as allowing the secondary controller chip to update the status of the host data access command in the primary controller chip.

In block 350, the primary controller chip may determine whether it is responsible for any of the data referenced in the host data access command. This determination mimics the process discussed above with respect to the secondary controller chip in block 330 and may be done in parallel with that process.

In block 360, the host data access command is executed by the primary controller chip. Similar operations occur with respect to the secondary controller chip if portions of the referenced data are the responsibility of the secondary controller chip. For a host data access command to write data to storage media, the DMA module of the host controller is instructed to transfer the data referenced in the host data command from the host device to the media controller, which subsequently writes the transferred data to the storage media. For a host data access command to read data from the storage media, the media controller is instructed to read the requested data from the storage media and place the read data in a buffer for temporary storage. The DMA module of the host controller is then instructed to transfer the read data to the host device.

According to aspects of the subject technology, the secondary controller chip transfers data to and from the host device via the routing circuitry of the primary controller chip while executing host data access commands. This routing of data to and from the host device may not require the direct involvement of the processor circuitry, the host controller or the media controller of the primary controller chip allowing those components to complete the host data access commands for which the primary controller chip is determined to be responsible with minimal interruption.

In block 370, the primary controller chip determines if execution of the host data access command has been completed. The host controller must determine if the host data access command has been completed for the entire range of data referenced in the command. Accordingly, the host controller of the primary controller chip must wait for an indication from the host controller of the secondary controller chip that the secondary controller chip has completed execution of the host data access command. The host controller of the secondary controller chip notifies the host controller of the primary controller chip rather than the host device when the secondary controller chip has completed the host data access command. Once all portions of the host data access command have been completed, the host command complete module of the host controller chip notifies the host device of the complete host data access command.

According to aspects of the subject technology, logical address range checking and locking may be performed prior to execution of the host data access command. The primary controller chip may lock the logical addresses referenced in a current host data access command to prevent subsequent host data access commands that reference at least one logical address in common from being executed until the current host data access command has been completed. Along these lines, if the current host data access command references one or more logical addresses that have been locked due to a previous host data access command still being executed, execution of the host data access command may be delayed until the previous host data access command has completed. The checking and locking may be limited with respect to the logical addresses for which the controller chip is responsible. Each controller chip may implement its own respective checking and locking operations to free up resources on the primary controller chip, or the primary controller chip can manage the checking and locking for all of the controller chips in the data storage system when more than one controller chip is used.

While the foregoing examples have described the primary controller chip interpreting and processing host data commands to determine responsibility for the data referenced in the host data commands, each of the controller chips in a multiple controller chip configuration of a data storage system may perform this functionality to determine its own responsibility. Under this arrangement, the host data access command can be transferred to each of the controller chips in the data storage system and each respective controller chip determines its own responsibility with respect to the host data access command. For example, under the modulo example mentioned above, a primary controller chip responsible for odd logical addresses may determine whether the host data access command includes odd logical addresses and a secondary controller chip responsible for even logical addresses may determine whether the host data access command includes even logical addresses. Each respective controller chip may be configured to modify host data access commands to remove the logical addresses from the host data access command for which the respective controller chip is not responsible or even skipping processing of the host data access command that does not include any logical addresses for which the respective controller chip is responsible.

Figure 4:
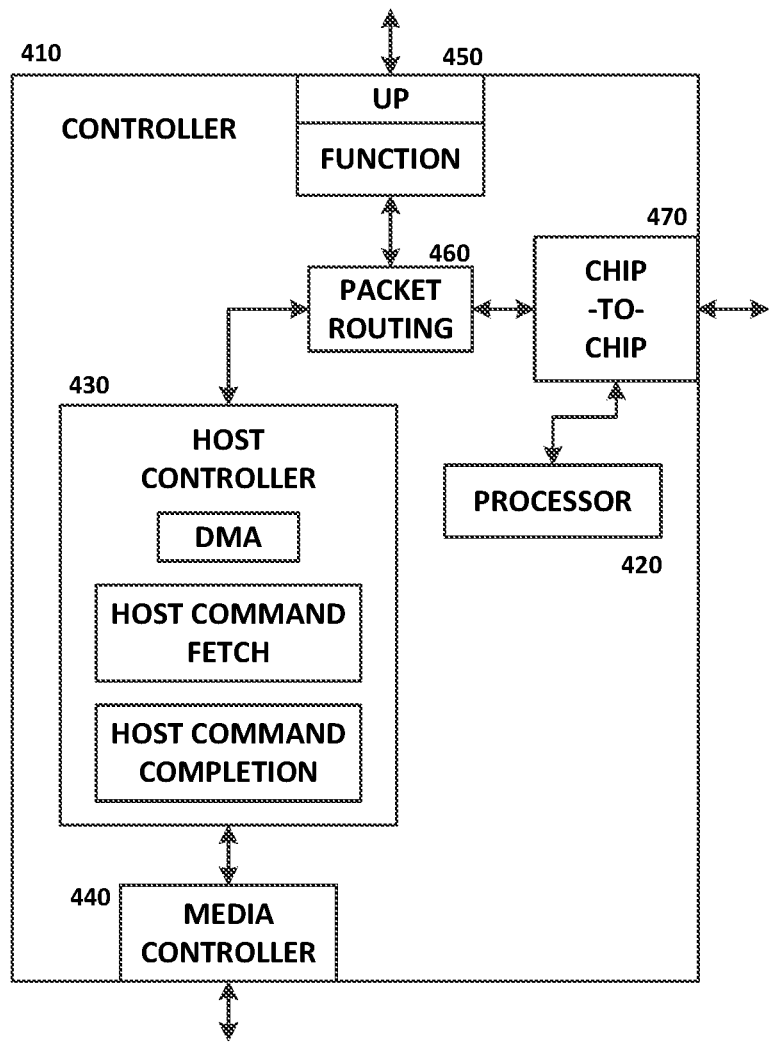
FIG. 4 is a block diagram depicting components of a controller chip according to aspects of the subject technology.

FIG. 4 is a block diagram depicting components of a controller chip according to aspects of the subject technology. Controller chip 410 depicted in FIG. 4 includes processor circuitry 420, host controller 430 and media controller 440. These components correspond to the similarly named components described above with respect to FIG. 2, for example. However, compared to the controller chips depicted and described with respect to FIG. 2, controller chip 410 includes different routing circuitry than switches 250a and 250b shown in FIG. 2. In particular, controller chip 410 includes UP 450 including circuitry to implement a standard endpoint in protocols such as PCIe and chip-to-chip circuitry 470 to implement the extension interface packaging data and managing communications with another controller chip coupled through the chip-to-chip circuitry 470. Packet routing circuitry 460 may examine packets received and packets sent to determine whether the packets should remain within the controller chip or be forwarded to a host device based on addresses within the packets or other information used by the protocol of the host interface.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A system for data storage, comprising:
   a first controller device comprising a host interface and an extension interface, the host interface for coupling to a host; and
   a second controller device coupled to the extension interface,
   wherein the second controller device is one of one or more second controller devices, wherein a bandwidth of the extension interface does not exceed a bandwidth of the host interface, wherein the bandwidth of the host interface is to be divided among the first controller device and the one or more second controller devices, wherein each of the first controller device and the second controller device is configured to utilize less than an entirety of the bandwidth of the host interface, and wherein the first controller device is configured to receive a host command via the host interface and transfer the host command to the second controller device via the extension interface.

2. The system of claim 1, wherein the first controller device comprises an internal interface configured to receive the host command or a second host command for execution in the first controller device, and wherein the bandwidth of the host interface is not less than a sum of a bandwidth of the internal interface and the bandwidth of the extension interface.

3. The system of claim 1, wherein the first controller device is configured to cause:
   identifying data associated with the host command;
   determining that at least a first portion of the data is attributed to the first controller device;
   executing the host command for the first portion of the data in a first storage media of the first controller device;
   determining that a second portion of the data is attributed to the second controller device;
   transferring the host command to the second controller device in response to determining that the second portion of the data is attributed to the second controller device; and
   notifying the host that execution of the host command is completed in response to the second controller device completing execution of the transferred host command and in response to the first controller device completing execution of the host command.

4. The system of claim 3, wherein the first controller device is configured to cause:
   determining a logical namespace of the data associated with the host command; and
   comparing the logical namespace with a logical name space associated with the second controller device and a second storage media of the second controller device.

5. The system of claim 3, wherein the first controller device is configured to cause:
   determining logical addressing of the data associated with the host command; and
   comparing the logical addressing to a logical address range associated with the second controller device and a second storage media of the second controller device,
   wherein the logical addressing of the second portion of the data is within the logical address range.

6. The system of claim 5, wherein the first controller device is configured to cause modifying the host command based on the logical address range and transferring the host command to the second controller device.

7. The system of claim 1, wherein the host interface and the extension interface comprise respective peripheral component interconnect-express (PCIe) interfaces, wherein the bandwidth of the host interface corresponds to a bandwidth associated with PCIe x32, wherein the bandwidth of the extension interface corresponds to a bandwidth associated with PCIe x4, and wherein an amount of available bandwidth supports at least eight respective controller devices and associated storage media based at least in part on a ratio of the bandwidth associated with PCIe x32 and the bandwidth associated with PCIe x4.

8. The system of claim 1, wherein the first controller device comprises a respective host controller, the respective host controller comprising a direct memory access module, a host command fetch module and a host command complete module,
   wherein the direct memory access module is configured to transfer data between the host and components within the first controller device,
   wherein the host command fetch module is configured to fetch a respective host command from the host when the respective host command is ready for processing, and
   wherein the host command complete module is configured to notify the host that the respective host command is completed.

9. The system of claim 1, wherein the first controller device comprises a switch having ports associated with the host interface and the extension interface.

10. A machine-implemented method for a data storage system, comprising:

acquiring a host command at a first controller device of the data storage system, from a host, via a host interface of the first controller device; and transferring the host command from the first controller device to a second controller device coupled to the first controller device via an extension interface of the first controller device, wherein the second controller device is one of one or more second controller devices, wherein a bandwidth of the host interface is split among the first controller device and the one or more second controller devices, and wherein each of the first controller device and the second controller device utilizes less than an entirety of the bandwidth of the host interface.

11. The machine-implemented method of claim 10, wherein the first controller device comprises an internal interface which receives the host command or a second host command for execution, and wherein the bandwidth of the host interface is equal to or greater than a sum of a bandwidth of the internal interface and the bandwidth of the extension interface.

12. The machine-implemented method of claim 10, further comprising: receiving an indication that execution of the transferred host command by the second controller device is completed, wherein a notification is provided to the host in response to the received indication.

13. The machine-implemented method of claim 10, comprising:
   identifying data associated with the host command;
   determining that at least a first portion of the data is attributed to the first controller device;
   executing the host command for the first portion of the data in a first storage media of the first controller device;
   determining that a second portion of the data is attributed to the second controller device;
   transferring the host command to the second controller device in response to determining that the second portion of the data is attributed to the second controller device; and
   notifying the host that execution of the host command is completed in response to the second controller device completing execution of the transferred host command.

14. The machine-implemented method of claim 13, wherein determining that the second portion of the data is attributed to the second controller device comprises:
   determining logical addressing of the data associated with the host command; and
   comparing the logical addressing to a logical address range associated with the second controller device,
   wherein logical addressing of the second portion of the data is within the logical address range.

15. The machine-implemented method of claim 14, further comprising: modifying the host command based on the logical address range, wherein the modified host command is transferred to the second controller device.

16. The machine-implemented method of claim 13, wherein determining that the second portion of the data is attributed to the second controller device comprises:
   determining a logical namespace of the data associated with the host command; and
   comparing the logical namespace of the data with a logical name space associated with the second controller device,
   wherein the logical namespace of the second portion of the data matches the logical name space associated with the second controller device.

17. The machine-implemented method of claim 13, further comprising:
   acquiring the host command at the second controller device via a host interface of the second controller device;
   executing the host command by the second controller device for the second portion of the data; and
   notifying the first controller device that the host command is completed for the second portion of the data.

18. An apparatus, comprising:
   means for acquiring a host command at a first controller device, from a host, via a host interface of the first controller device; and
   means for transferring the host command from the first controller device to a second controller device coupled to the first controller device via an extension interface of the first controller device,
   wherein the second controller device is one of one or more second controller devices, wherein a bandwidth of the extension interface does not exceed a bandwidth of the host interface, and wherein each of the first controller device and the second controller device utilizes less than an entirety of the bandwidth of the host interface.

19. The apparatus of claim 18, comprising:
   means for identifying data associated with the host command;
   means for determining that the first controller device is responsible for a first portion of the data associated with the host command;
   means for determining that the second controller device is responsible for a second portion of the data associated with the host command;
   means for transferring the host command to the second controller device in response to determining the second controller device is responsible for the second portion of the data associated with the host command; and
   means for notifying the host that execution of the host command is completed in response to the first controller device completing execution of the host command for the first portion of the data.

20. The apparatus of claim 18, wherein the first controller device comprises an internal interface configured to receive the host command or a second host command for execution, and wherein the bandwidth of the host interface is not less than a sum of a bandwidth of the internal interface and the bandwidth of the extension interface.

* * * * *